United States Patent [19]

DiCarlo

[11] Patent Number: 4,836,595
[45] Date of Patent: Jun. 6, 1989

[54] PIPE HANDLING APPARATUS

[76] Inventor: Frank DiCarlo, 2580 Harvest La., Springfield, Oreg. 97477

[21] Appl. No.: 190,673

[22] Filed: May 5, 1988

[51] Int. Cl.⁴ .......................... B25J 1/02; B65G 7/00
[52] U.S. Cl. ...................................... 294/15; 294/19.1
[58] Field of Search ............................. 294/4, 15–18, 294/19.1, 22, 26; 29/272; 254/120, 121, 131, 133 R; 403/53, 57, 58, 83, 84, 104; 414/22, 23, 747

[56] References Cited

U.S. PATENT DOCUMENTS

| | | | |
|---|---|---|---|
| 662,342 | 11/1900 | Berry | 294/17 X |
| 781,973 | 2/1905 | Turney | 294/19.1 |
| 951,341 | 3/1910 | Shelton et al. | 294/17 |
| 1,021,650 | 3/1912 | Worthington | 294/19.1 X |
| 1,205,852 | 11/1916 | Buehler | 294/15 X |
| 1,401,046 | 12/1921 | Clymer | 294/15 |
| 1,510,773 | 10/1924 | Farnsworth | 294/15 |
| 1,551,390 | 8/1925 | Haymaker et al. | 294/15 |
| 2,444,353 | 6/1948 | Kimmey | 294/4 |
| 2,623,770 | 12/1952 | Eby | 294/19.1 |
| 2,720,410 | 10/1955 | Smith | 294/19.1 |
| 4,013,313 | 3/1977 | Gardels | 294/17 |

Primary Examiner—Johnny D. Cherry
Attorney, Agent, or Firm—James D. Givnan, Jr.

[57] ABSTRACT

Apparatus for handling a pipe being laid in a trench and including an elongate handle equipped with an inverted U-shaped member for guiding a pipe end into inserted engagement with an adjacent pipe end. The handle and U-shaped member are joined by a coupling. The apparatus includes a handle equipped plate member for temporary closing of a pipe end during positioning of same into place.

1 Claim, 1 Drawing Sheet

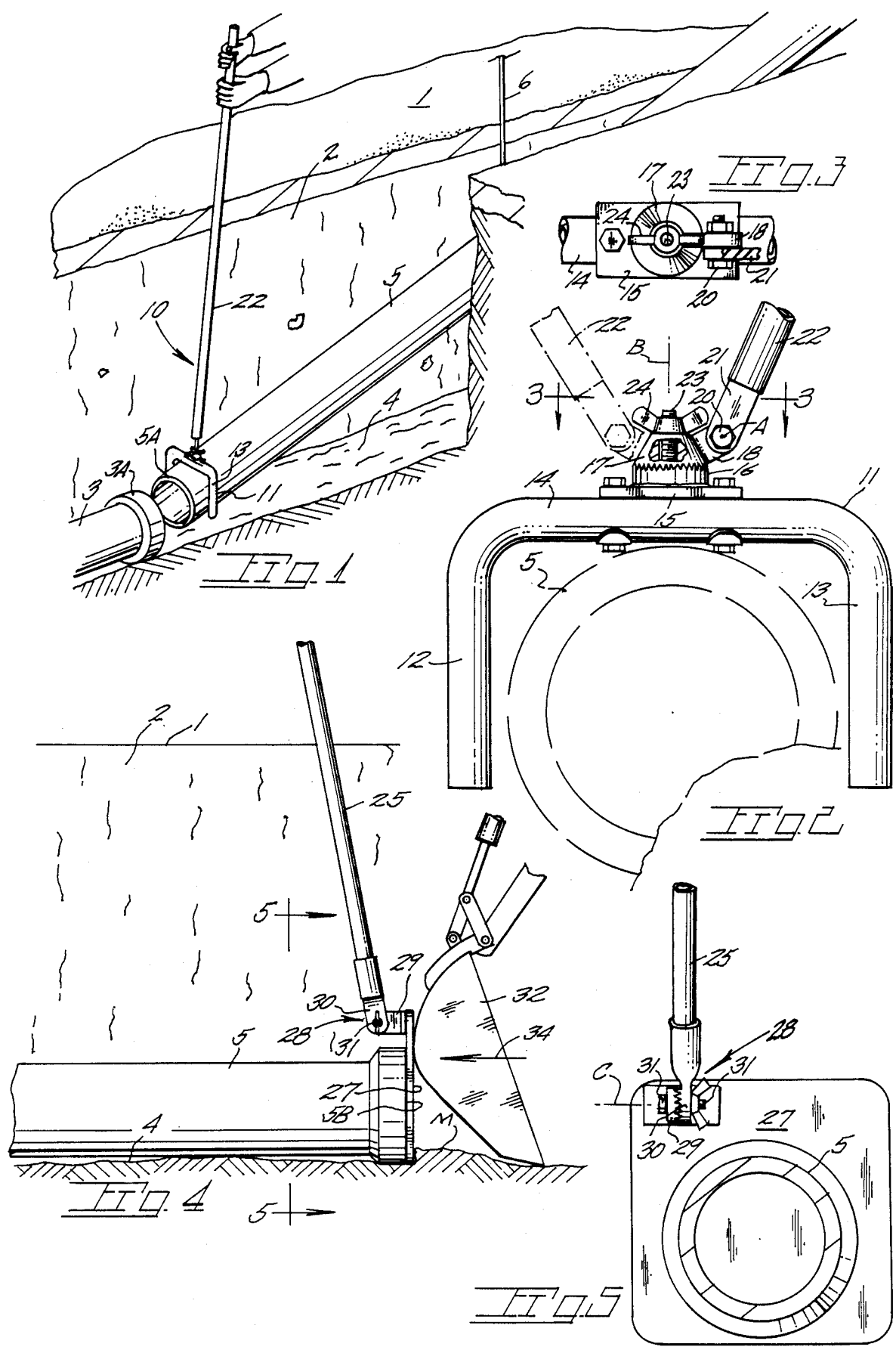

4,836,595

PIPE HANDLING APPARATUS

BACKGROUND OF THE INVENTION

The present invention pertains generally to hand operated tools used in the positioning of large and cumbersome articles.

In the laying of large diameter pipe of the type, for example, used in municipal water systems, it is necessary to align and guide a pipe end into coupled engagement with the end of a previously laid pipe. Toward this end it is common practice to station a workman in the pipe receiving trench. Governmental safety regulations now require that before any workman may descend into a ditch, of a depth of five feet or so, the ditch must be shored to prevent collapse of the ditch walls. Obviously such collapse could result in serious injury or even death. The installation and removal of shoring from a ditch incurs substantial time, materials and effort to greatly increase the cost of a pipe laying operation.

Additionally, it is common practice to temporarily position a barrier at the open end of a pipe being laid while a powered instrumentality such as the bucket of a backhoe machine urges the pipe lengthwise into place. In this instance, a worker normally holds a plate in place over the pipe end to prevent the entry of dirt, gravel, etc., into the pipe. Heretofore in pipe laying operations at five feet or greater depths, the presence of a worker or workers in the ditch necessitated a considerable shoring effort as it was necessary that the pipe be manually aligned and secondly, to position a barrier placed over the open pipe end to prevent the entry of foreign material. In addition to the added cost of shoring the ditch walls, the stationing of a worker or workers in the trench incurred a degree of risk with or without shoring.

SUMMARY OF THE PRESENT INVENTION

The present invention is embodied within hand operated tools which permit the precise positioning of a pipe end and the closing of the remaining pipe end with both tasks being done in a remote manner.

A pipe positioning tool is shaped at its lower end so as to confine a pipe segment therein to permit the worker to guide said end into engagement with the end of a previously installed pipe. A handle is adjustably mounted on a pipe confining member to permit convenient manipulation regardless of worker location and the width and depth of the trench. The present invention ideally includes a combination push plate and barrier for positioning over the open end of the pipe being installed. The pipe is slid into final position by the application of force such as by a backhoe carried bucket with the combination push plate and barrier isolating the pipe end form the backhoe bucket. Accordingly, a worker or workers need not be located in the trench during a pipe laying operation and hence avoid risk of injury. Secondly, shoring of ditch walls is avoided at considerable cost savings to the contractor and/or municipal utility agency. With the present tools, pipe laying may be accomplished in a remote manner at substantial depths beyond the five foot level.

Important objectives of the present pipe laying apparatus include the provision of a pipe positioning tool for guiding the end of a pipe into engagement with a previously installed pipe from a remote locatoin to avoid positioning of a worker within a ditch and hence the shoring of same; the provision of a highly adaptable pipe positioning tool readily adjustable to laying pipe at different depths and in trenches of different widths; the provision of a push plate and barrier for placement over a pipe end to protect the pipe from a powered instrumentality used in final positioning of the pipe as well as to prevent entry of foreign matter into the pipe.

BRIEF DESCRIPTION OF THE DRAWINGS

In the accompanying drawings:

FIG. 1 is a perspective view of a pipe positioning tool operatively disposed in guiding a pipe end segment into place;

FIG. 2 is an enlarged fragmentary elevational view of the tool shown in FIG. 1;

FIG. 3 is a horizontal sectional view taken downward along line 3—3 of FIG. 2;

FIG. 4 is a side elevational view of pipe handling apparatus in use during the axial positioning of pipe in a trench; and FIG. 5 is a vertical sectional view taken along line 5—5 of FIG. 4.

DETAILED DESCRIPTION OF THE PREFERRED EMBODIMENTS

With continuing attention to the drawings wherein applied reference numerals indicate parts similarly hereinafter identified, the reference numeral 1 indicates a ground surface such as pavement or earthen material in which a trench 2 has been dug. Typically, though not exclusively, municipal water lines are installed along thoroughfares or right-of-ways at depths of several feet.

In place within trench 2 is shown the end of a previously installed pipe 3 in place on a trench bottom 4 several feet below surface 1. A pipe at 5 is shown in the process of being installed with a winch operated cable at 6 supporting pipe 5. During such installation, the lowermost end 5A of pipe 5 must be inserted within a bell housing or coupling 3A of installed pipe 3. Housing 3A is normally provided with a resilient ring to effect a seal between the pipes. Prior to insertion of pipe end segmetn 5A, it is necessary that pipe 5 be in substantial alignment with pipe 3 and toward this end the present apparatus is directed.

The present apparatus includes a tool generally at 10 having pipe confining means 11 disposed at its lower end and shown as an inverted, U-shaped structure with legs at 12 and 13 and a cross member 14. A plate 15 on cross member 14 carries coupling means including a circular ring 16 against which may be locked a cap 17. Correspondingly shaped teeth formed on ring 16 and cap 17 facilitate locking engagement of cap and ring. A threaded spindle 23 is fitted with a wing nut 24 to permit locking of cap 17 at a selected rotated position about ring 16. An ear 18 on the cap is apertured to receive a fastener assembly 20 which also extends through an apertured ear 21 depending from an elongate tubular handle 22. Accordingly, handle 22 may be positioned about multiple axes i.e., the axis A of fastener assembly 20, as well as about the axis B of threaded spindle 23, to enable a wide range of handle position to permit adjustment of the apparatus to best suit the pipe laying job at hand. Further, handle 22 may be telescopic.

With regard to the apparatus shown in FIGS. 4 and 5, the same includes a tubular handle 25 and is shown in use during axial positioning of pipe 5 along the trench bottom 4. A combination push plate and barrier is at 27 which additionally serves to close pipe end 5B against entry of foreign matter. Coupling means at 28 includes apertured flanges 29-30 and a fastener assembly 31 joining the latter to handle 25 in a manner adjustable about fastener axis C. Subsequent to axial alignment of the pipe being installed with a previously installed pipe, considerable force is required to effect seating of pipe end 5A in housing 3A which force typically is often provided by a backhoe machine. A backhoe bucket 32 imparts such axial movement to pipe 5, per arrow 34, with push plate and barrier 27 preventing damage to pipe 5 as well as blocking the entry of earthen material M into the end of pipe 5.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:
1. Pipe handling apparatus comprising,
an elongate handle for grasping by both hands of a worker,
a pipe engaging member of inverted U-shape at one end of said handle for contact with the pipe being laid during positioning of same by a mechanized instrumentality, and
coupling means attaching said handle to said pipe engaging member, said coupling means including a plate, means mounting said plate on said U-shaped member, a cap including an ear to which said handle is pivotally attached, an upright threaded spindle on said plate and extending upwardly through said cap and receiving a nut element to permit locking of the cap to said plate in a selected relationship about said spindle for positioning of said handle to facilitate pipe positioning.

* * * * *